Patented Sept. 12, 1950

2,521,672

UNITED STATES PATENT OFFICE 2,521,672

CATALYTIC CURING OF ORGANO-SILOXANE RESINS

Luther F. Berhenke, Midland, Mich., and Laurence W. Byers, Urbana, Ill., assignors to The Dow Chemical Company, a corporation of Delaware No Drawing. Application April 29, 1946, Serial No. 665,902

4 Claims. (Cl. 260—46.5)

This invention relates to organo-siloxane resins of high molecular weight having improved curing and ageing characteristics.

The resins with which this invention is concerned are organo-siloxane polymers containing in the molecule a plurality of silicon atoms connected to each other by oxygen atoms, all valences of the silicon not satisfied by said oxygen being occupied by monovalent organic radicals such as alkyl, aryl or aralkyl radicals. More particularly, this invention concerns organo-siloxane polymers which contain the structural units ($RSiO_{1.5}$) and ($R'R''SiO$), in which R, R', and R'' are monovalent hydrocarbon radicals. Examples of suitable radicals include alkyl radicals such as methyl, ethyl, propyl, to octadecyl or higher; aryl and aralkyl radicals such as phenyl, tolyl, xenyl, naphthyl, benzyl, phenethyl, etc. The organic radicals may contain inorganic substituents, e. g. chlorine or bromine.

In general, organo-siloxane polymers may be prepared by the hydrolysis of suitable hydrolyzable organo-silanes, and condensation of the hydrolysis products. By "hydrolyzable organo-silanes" we mean organo-silicon compounds which contain readily hydrolyzable groups such as halogen atoms, hydrocarbonoxy radicals, amino groups, etc., attached to the silicon atom, together with the desired hydrocarbon, or halohydrocarbon, radicals. Hydrolysis of the hydrolyzable organo-silanes, or mixtures thereof, is generally accompanied by concurrent condensation of the hydrolysis products to a greater or less degree, depending upon the nature of the starting material and the conditions under which the hydrolysis is conducted.

When the starting material comprises a mixture of hydrolyzable organo-silanes containing one or two hydrocarbon radicals attached directly to each silicon atom, there is usually produced a liquid benzene-soluble mixture of organo-siloxane polymers which may be wholly or partially condensed, and which contain a statistical average of more than one and less than two hydrocarbon radicals per silicon atom. These liquid, soluble intermediate products may be rendered more viscous by heating. On prolonged heating, they are finally set up or "cured" to hard, infusible resins. Such intermediate resinous products are suitable as impregnating and coating materials for metals, glass, and other materials, and are frequently employed as impregnating varnishes for electrical apparatus.

However, the utility of such a product is dependent to a large extent upon the time and temperature required to cure the same to the hard, insoluble state, as well as the ageing characteristics of the finished product. For example, it is desirable that cured coatings of the products on wire should be hard, but flexible, and not subject to crazing or cracking upon prolonged heating. Further, in the impregnation of electrical apparatus, e. g. electrical coils, it is necessary that the conductors and insulation be bound into a unitary structure which does not soften and allow movement of the conductors when the apparatus is heated. It is therefore highly desirable that the resin be completely cured throughout. To insure such complete curing frequently necessitates heating an organo-siloxane resin at temperatures in the order of from 200° to 350° C. for periods as long as from 3 to 7 days or more.

It is an object of this invention to provide a method whereby through-curing of organo-siloxane resins to obtain cured products of good quality may be obtained in periods which are economical to use and at temperatures which are within the range of most industrial equipment, e. g. 150° to 250° C.

It is known that the addition of lead salts to liquid organo-siloxane polymers causes the material to gel in a very short time. The presence of even very small amounts of lead compounds in solutions of organo-siloxane resins frequently results in the formation of gels during storage of such solutions. In addition, the resinous products which are obtained by the use of lead salts as driers or accelerators, usually lack the toughness and flexibility of resins obtained from the untreated material.

We have found that hydrocarbon-soluble compounds of cobalt, zinc, calcium or manganese, particularly their resinates and naphthenates, may be added to intermediate organo-siloxane polymers which contain the structural units, ($RSiO_{1.5}$) and ($R'R''SiO$), in which R, R', and R'' have the meaning previously given, to produce resinous compositions which have desirable properties not possessed by the untreated resins. Apparently the identity of the non-metal portion of the compound is of secondary importance; however, it is very desirable that the compound be soluble in, or compatible with, the organo-siloxane. We have found that organo-siloxane polymers containing catalytic amounts of cobalt, zinc, calcium and manganese compounds, particularly cobalt naphthenate, may be cured in a shorter time with heating at a lower temperature than the untreated materials, and thereby produce hard resinous films or coatings which are hard throughout and have greater flexibility and resistance to heat without crazing or cracking than are obtained from the untreated resins. The metal catalyst may be added to the resin at any stage in the resinification or bodying thereof, prior to the final curing.

The optimum resin and catalyst concentration depends to a large extent on the particular organo-siloxane resin treated, the type of metal compound used, and the particular properties desired in the final product. The compound may be used in amount such as to contain as little as 0.01 part by weight or less of the metal component thereof for each 100 parts of organo-siloxane. We prefer to use from 0.05 to 1.00 part by weight of the metal (in such compound) per 100 parts of resin solids.

Commercially available paint driers or accelerators comprising solutions of cobalt, zinc, manganese and calcium compounds, e. g. resinates or naphthenates, in inert organic solvents such as turpentine or mineral spirits are satisfactory for purposes of this invention. It is very desirable that the carrier solvent be compatible with the organo-siloxane to be treated. Examples of suitable commercial products are "Nuodex, 6% Mn," "Nuodex, 6% Co," "Nuolate, 3% Ca," etc.

In practice, the metal compound or dispersion thereof is added to the organo-siloxane polymer with stirring. If desired, the organo-siloxane polymer may be diluted or admixed with an inert organic solvent, e. g. an aromatic hydrocarbon, a ketone, etc., to a predetermined viscosity suitable for the particular application for which the resin is intended. This is of particular advantage when the resin is to be applied as a film or coating. The treated resin solution may be used immediately, or may be stored at room temperature or below in a non-oxidizing atmosphere. The resin solution may be applied to solid surfaces in usual ways, e. g. by brushing, dipping, or spraying. Thereafter the impregnated or coated material may be cured to a substantially insoluble state by heating at temperatures of from 150° to 250° for from approximately 1 to 4 hours.

The following examples are illustrative of modes of applying the principle of the invention, but are not to be construed as limiting its scope:

Example 1

A mixture comprising approximately 40 mol per cent of methyl phenyl dichlorosilane, 25 mol per cent of methyl trichlorosilane, 30 mol per cent of phenyl trichlorosilane and 5 mol per cent of dimethyl dichlorosilane was hydrolyzed by slowly adding a toluene solution thereof to water. During the addition, the temperature of the reaction mixture was maintained at approximately 25° C. Thereafter, the aqueous layer which separated was removed, and the toluene solution of hydrolysis products was washed free of acid. After distilling off the toluene and residual water, the organo-siloxane product was bodied by heating at from 140° to 170° C. until a test portion when diluted with its own weight of toluene had a viscosity of approximately 85 centistokes at 25° C. The bulk of the product was then diluted with toluene to give a solution containing approximately 60 per cent by weight of resin and cooled.

To a portion of the above described resin solution was added cobalt naphthenate in amount such as to contain 0.1 part by weight of cobalt for each 100 parts of organo-siloxane resin. The product was spread as a film of approximately 2 mils thickness on cadmium-coated copper test panels and cured by heating in an oven maintained at 150° C. Simultaneously, panels coated with the untreated resin were also tested. Curing time is reported as the number of hours of heating required to produce a tack-free coating. Thereafter, heating of the test panels was continued. Periodically, the panels were removed from the oven, cooled to room temperature, and bent over an eighth-inch mandrel. If the coating showed no evidence of cracking, the heating was resumed. This test serves as a measure of the flex life of a resin at a given temperature. By these tests the cobalt-containing resinous coating had a curing time of less than 1 hour, and after more than 175 hours of heating at 150° C. showed no signs of cracking when bent over a mandrel as described above. The untreated required 30 hours of heating to become tack-free, and had a flex life of 105 hours.

At 250° C., metal strips coated with the cobalt-containing resin required less than 1 hour to cure, and had an average flex life of 55 hours. The untreated resin had a curing time of 2 hours, and a flex life of 35 hours.

Example 2

By procedure similar to that described in Example 1, a resin was prepared which had an average composition of 35 mol per cent of methyl phenyl siloxane, $(CH_3(C_6H_5)SiO)$, units; 30 mol per cent of phenyl siloxane, $(C_6H_5SiO_{1.5})$, units; 30 mol per cent of methyl siloxane, $(CH_3SiO_{1.5})$, units; and 5 mol per cent of dimethyl siloxane $((CH_3)_2SiO)$ units.

Metal strips were coated with thin films of (1) untreated resin; (2) resin containing cobalt naphthenate in amount corresponding to 0.05 part by weight of cobalt per 100 parts of organo-siloxane; (3) resin containing approximately 0.1 part of cobalt per 100 parts of organo-siloxane.

At 150° C., the coating of untreated resin had a curing time of from 10 to 15 hours and a flex life of 45 hours. The coatings containing cobalt naphthenate both cured in less than 1 hour and had a flex life of 150 hours or more.

At 250° C., the coating of untreated resin as well as the coatings containing cobalt naphthenate cured in less than 1 hour; the flex life for the untreated resin was 10 hours and for the cobalt-containing resins was 40 hours.

Example 3

A mixture of methyl trichlorosilane, phenyl trichlorosilane and methyl phenyl dichlorosilane in substantially equimolecular proportions, was reacted with water and the resultant oily product was washed free of acid. The product was then heat-bodied until a 50 per cent solution thereof in toluene had a viscosity of from 1 to 2 poises.

Metal panels were coated with thin films of the resinous material, (1) untreated and (2) containing 0.1 part of cobalt as cobalt naphthenate per 100 parts of resin solids. The untreated resinous coating required more than 30 hours of heating at 150° C. to become tack-free. The cobalt-containing resin became tack-free after from 1 to 6 hours of heating.

In another experiment, coated panels were cured by heating at 250° C. for 1 hour. The softening point of the film was determined by heating the coated panel in contact with a standardized metal weight. In this test, the softening point is designated as that temperature at which electrical contact is made between the metal of the panel and the weight. For the untreated resin, the softening point of the film was approximately 57° C. The cobalt-containing resin had a softening point of approximately 165° C.

*Example 4*

Separate portions of the heat-bodied, but uncured, polysiloxane solution of Example 3 were treated, respectively, with naphthenates of cobalt, zinc, manganese, or calcium. The naphthenates were added in amounts such that the solutions contained in some instances 0.2, and in other instances 0.4, part by weight of the metal of the naphthenate per 100 parts of the organo-siloxane. Metal panels were coated with thin films of the respective solutions and the panels were heated at the temperatures indicated in the following table for 1 hour, at the end of which time the coatings were tack-free. The softening point of each coating was determined as in Example 3. The table names the metal employed, in the form of a metal naphthenate, in each test, gives the proportion thereof as parts by weight of the metal per 100 parts of the organo-siloxane, states the temperature at which each coated panel was cured, and gives the softening point of each cured organo-siloxane film.

| Metal Content | Softening Point in ° C. of Film Cured at— | | |
|---|---|---|---|
| | 150° C. | 200° C. | 250° C. |
| 0.2 Co | 43 | 112 | 165 |
| 0.2 Zn | 39 | 81 | 158 |
| 0.2 Ca | 36 | 63 | 144 |
| 0.4 Co | 50 | 120 | 185 |
| 0.4 Zn | 50 | 111 | 174 |
| 0.4 Ca | | | 152 |
| 0.4 Mn | | 46 | 95 |

Other modes of applying the invention may be employed instead of those explained, change being made as regards the compounds and materials herein disclosed, provided the steps or compounds stated by any of the following claims or equivalents of such steps or compounds be employed.

We therefore point out and distinctly claim:

1. The process which comprises heat-curing, in the absence of other curable organic materials, a benzene-soluble organo-siloxane polymer containing in the molecule the structural units ($RSiO_{1.5}$) and ($R'R''SiO$) in which R, R', and R'' are monovalent hydrocarbon radicals, and from 55 to 67 per cent of the total number of said structural units are the units ($RSiO_{1.5}$), in admixture with a paint drier selected from the group consisting of cobalt, manganese, zinc and calcium compounds which are soluble in a solvent of the group consisting of turpentine and mineral spirits.

2. The process which comprises heating a mixture of a benzene soluble organo-siloxane polymer containing in the molecule the structural units ($RSiO_{1.5}$) and ($R'R''SiO$) in which R, R', and R'' are monovalent hydrocarbon radicals, and from 55 to 67 per cent of the total number of said structural units are the units ($RSiO_{1.5}$), and a paint drier selected from the group consisting of cobalt, manganese, zinc and calcium compounds, which are soluble in a solvent of the group consisting of turpentine and mineral spirits, in the presence of an inert liquid diluent, and in the absence of curable organic ingredients other than the organo-siloxane polymer, at a temperature of from 150° to 250° C.

3. The process which comprises applying to a surface of a solid base member, a film of a solution consisting of a benzene soluble organo-siloxane polymer containing in the molecule the structural units ($RSiO_{1.5}$) and ($R'R''SiO$) in which R, R', and R'' are monovalent hydrocarbon radicals, and from 55 to 67 per cent of the total number of said structural units are the units ($RSiO_{1.5}$), in an inert organic solvent together with cobalt naphthenate, the latter being dispersed in the mixture in amount corresponding to from 0.05 to 1.0 part by weight of cobalt per 100 parts of organo-siloxane polymer, and heating the treated portion of the base member until the organo-siloxane polymer film is cured to a tack-free condition.

4. The process which comprises applying to a surface of a solid base member, a film of a solution consisting of an organo-siloxane polymer containing in the molecule the structural units, ($C_6H_5SiO_{1.5}$), ($CH_3SiO_{1.5}$), ($CH_3(C_6H_5)SiO$), and (($CH_3)_2SiO$), the sum of the number of ($C_6H_5SiO_{1.5}$) and ($CH_3SiO_{1.5}$) units being between 55 and 67 per cent of the total number of all of said structural units, in an inert organic solvent together with cobalt naphthenate, the latter being dispersed in the mixture in amount corresponding to from 0.05 to 1.0 part by weight of cobalt per 100 parts of organo-siloxane polymer, and heating the treated portion of the base member at a temperature of from 150° to 250° C. until the organo-siloxane film is cured to a tack-free condition.

LUTHER F. BERHENKE.
LAURENCE W. BYERS.

REFERENCES CITED

The following references are of record in the file of this patent:

UNITED STATES PATENTS

| Number | Name | Date |
|---|---|---|
| 2,258,218 | Rochow | Oct. 7, 1941 |
| 2,258,222 | Rochow | Oct. 7, 1941 |
| 2,386,259 | Norton | Oct. 9, 1945 |
| 2,449,572 | Welsh | Sept. 21, 1948 |

OTHER REFERENCES

Official Digest, Nov. 1945, pages 424, 429, 430, 431, and 440.

Gardner et al.: National Paint Varnish and Lacquer Assoc., Circular 705, May 1945, pages 412 to 419.